(12) United States Patent
Pinagapani et al.

(10) Patent No.: US 12,715,517 B2
(45) Date of Patent: Aug. 25, 2026

(54) SILL ROCKER STEEL REINFORCEMENT SYSTEM

(71) Applicant: FCA US LLC, Auburn Hills, MI (US)

(72) Inventors: Sachithanandam Pinagapani, Troy, MI (US); Diane R Coopmans, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 377 days.

(21) Appl. No.: 18/498,145

(22) Filed: Oct. 31, 2023

(65) Prior Publication Data

US 2025/0136185 A1 May 1, 2025

(51) Int. Cl.

*B62D 25/02* (2006.01)
*B62D 21/15* (2006.01)
*B62D 27/02* (2006.01)

(52) U.S. Cl.

CPC ......... *B62D 25/025* (2013.01); *B62D 21/157* (2013.01); *B62D 27/023* (2013.01)

(58) Field of Classification Search

CPC ... B62D 25/025; B62D 21/157; B62D 27/023
See application file for complete search history.

(56) References Cited

U.S. PATENT DOCUMENTS 6,073,992 A 6/2000 Yamauchi et al.
6,193,306 B1 * 2/2001 Lee ...................... B62D 25/025 296/205
8,690,227 B2 4/2014 Matsuoka et al.
9,725,118 B2 8/2017 Alwan et al.
10,328,978 B2 6/2019 Yang et al.
2013/0049405 A1 2/2013 Kurogi et al.
2022/0135136 A1 * 5/2022 Halonen .............. B62D 27/065 296/209
2023/0347986 A1 * 11/2023 Kuipers ............... B62D 25/025

FOREIGN PATENT DOCUMENTS

CN 107031729 A 8/2017
CN 112277584 A 1/2021
EP 1764288 A2 * 3/2007 ......... B62D 25/2036
EP 1840003 A2 10/2007
EP 2230156 B1 1/2012
EP 3090923 A1 11/2016

* cited by examiner

*Primary Examiner* — Daniel J Colilla
(74) *Attorney, Agent, or Firm* — Jeremy J. Klobucar

(57) ABSTRACT

A reinforcement beam for a vehicle sill has a first elongated beam with an overall cup shape in cross section with one side longer than the other. A first and second flange that are offset with respect to one another. A second elongated beam panel, opposing the first beam with an overall cup shape in cross section with one side longer than the other. A first and second flange offset with respect to one another. A third and fourth elongated beam panel have an overall L-shape in cross section with a long leg and a short leg. The third and fourth beams are positioned between the first and second beam panels with the long leg of the L-shape extending through the flanges of the first and second panel.

15 Claims, 4 Drawing Sheets

SILL ROCKER STEEL REINFORCEMENT SYSTEM

FIELD

The present disclosure relates to vehicles and, more particularly, to sill reinforcement systems.

BACKGROUND

This section provides background information related to the present disclosure which is not necessarily prior art.

In electric vehicles, the batteries are positioned underneath the vehicle cab or passenger area. Thus, the batteries are positioned between the driver and passenger sides of the vehicle. Accordingly, it is desirable to protect the batteries against side impact that may occur to the vehicle. Thus, it is desirable to have a sill or rocker panel reinforcement system.

Current sill reinforcement systems are ordinarily formed from aluminum material. The reinforcement systems are positioned inside of the sill inner panel and the sill outer panel. Thus, the reinforcement structure absorbs energy that may occur during an impact. While these designs appear to be satisfactory, designers are always striving to improve the art.

Accordingly, the present disclosure provides the art with a steel sill reinforcement system. The steel reinforcement system is installed inside the sill or rocker panel of the automotive vehicle to absorb energy during side or offset frontal impacts. The disclosure provides a reinforcement system that includes steel parts that are either stamped or roll formed and joined together by welding or other fastening options. The present disclosure provides a less expensive and easily weldable steel structure with marginal mass difference. The disclosure is independent of the body side outer sill. Also, the present disclosure provides a range of gauge and material grade possibilities that enable tuning and optimizing for different vehicles without changing the basic design configuration.

SUMMARY

This section provides a general summary of the disclosure, and is not a comprehensive disclosure of its full scope or all of its features.

According to a first aspect of the disclosure, a reinforcement for a vehicle sill comprises a first elongated beam panel having an overall cup shape in cross section with two sides and a web. One side is longer than the other. A first and second flange are on each side of the cup shape so that the flanges are offset with respect to one another. A second elongated beam panel, opposing the first beam panel, has an overall cup shape in cross section with two sides and a web, one side being longer than the other. A first and second flange with one flange on each side of the cup shape so that the flanges are offset with respect to one another. The opposing first and second flanges secure to one another with the longer sides opposing one another. A third beam has an overall L-shape in cross section with a long leg and a short leg. The third beam panel is positioned between the first and second panels with the long leg of the L-shape extending through the flanges of the first and second panels. A fourth elongated beam has an overall L-shape in cross section with a long leg and a short leg. The fourth beam panel is positioned between the first and second beam panels with the long leg of the L-shape extending through the flanges of the first and second beam panels. The third and fourth panels long leg portions define a flange to secure with the vehicle sill. The third and fourth panels may have a flange on the short leg secured to opposite flanges of the first and second beam flanges. The third and fourth panel short legs terminate adjacent the long leg of the other of the third and fourth beam panels. The third and fourth panel long legs are interrupted along the length of the panel.

According to a second aspect of the disclosure, a vehicle with a sill or rocker panel comprising an inner sill panel and an outer sill panel with a reinforcement beam positioned between the inner and outer sill panels. The reinforcement beam comprising a reinforcement for a vehicle sill comprises a first elongated beam panel having an overall cup shape in cross section with two sides and a web. One side is longer than the other. A first and second flange on each side of the cup shape so that the flanges are offset with respect to one another. A second elongated beam panel, opposing the first beam panel, has an overall cup shape in cross section with two sides and a web, one side being longer than the other. A first and second flange are on each side of the cup shape so that the flanges are offset with respect to one another. The opposing first and second flanges secure to one another with the longer sides opposing one another. A third beam has an overall L-shape in cross section with a long leg and a short leg. The third beam panel is positioned between the first and second panels with the long leg of the L-shape extending through the flanges of the first and second panels. A fourth elongated beam has an overall L-shape in cross section with a long leg and a short leg. The fourth beam panel is positioned between the first and second beam panels with the long leg of the L-shape extending through the flanges of the first and second beam panels. The third and fourth panels long leg portions define a flange to secure with the vehicle sill. The third and fourth panels may have a flange on the short leg secured to opposite flanges of the first and second beam flanges. The third and fourth panel short legs terminate adjacent the long leg of the other of the third and fourth beam panels. The third and fourth panel long legs are interrupted along the length of the panel. The third and fourth panel long legs has a jog to define a U-shape with the short leg. One of the third and fourth beam panels L-shape long leg secures with the outer sill panel and the other of L-shape long leg secures to the inner sill panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
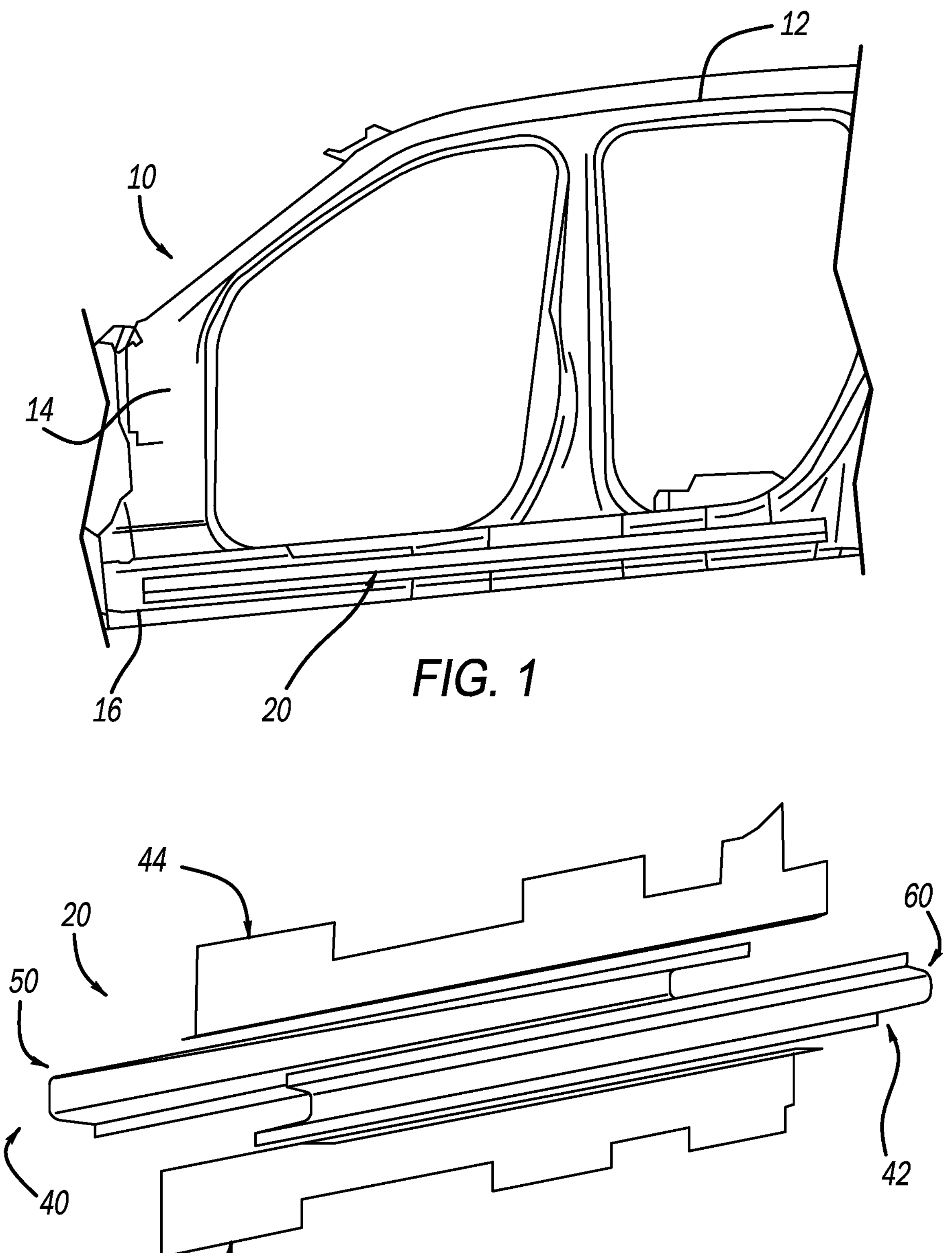
FIG. 1 is a schematic elevation view of a vehicle side body system.
FIG. 2 is an exploded view of the reinforcement beam.

Example embodiments will now be described more fully with reference to the accompanying drawings.

Turning to the figures, a vehicle side body system is illustrated and designated with the reference numeral 10. The side body system 10 includes a roof beam 12, a side beam 14 and a sill panel 16. A reinforcement beam 20 is positioned inside of the sill panel. The reinforcement beam 20 is positioned inside of the sill inner panel 22, sill inner reinforcement plate 24, sill outer reinforcement plate 26 and sill outer panel 28. The body side outer panel 30 is secured to the outer sill panel providing the sill or rocker panel of the vehicle. Also, the vehicle seat cross members 32 are positioned adjacent to the sill inner panel 22 and sill reinforcement plate 24.

The reinforcement beam 20 includes a first inboard side beam panel 40, a second outboard side beam panel 42, an inboard side middle beam panel 44 and an outboard side middle beam panel 46. All of the reinforcement panels 40, 42, 44 and 46 are elongated and extend the length of the sill or rocker panel as seen in FIG. 1.

The first reinforcement inboard side beam panel 40 includes an overall cup shape in cross-section with a cup portion 50 that includes a flange 52, 54 on each side of the cup portion 50. The flanges 52, 54 generally extend the length of the reinforcement beam panel 40. The flanges 52, 54 can be continuous or could include gaps along the flanges 52, 54.

Figure 3:
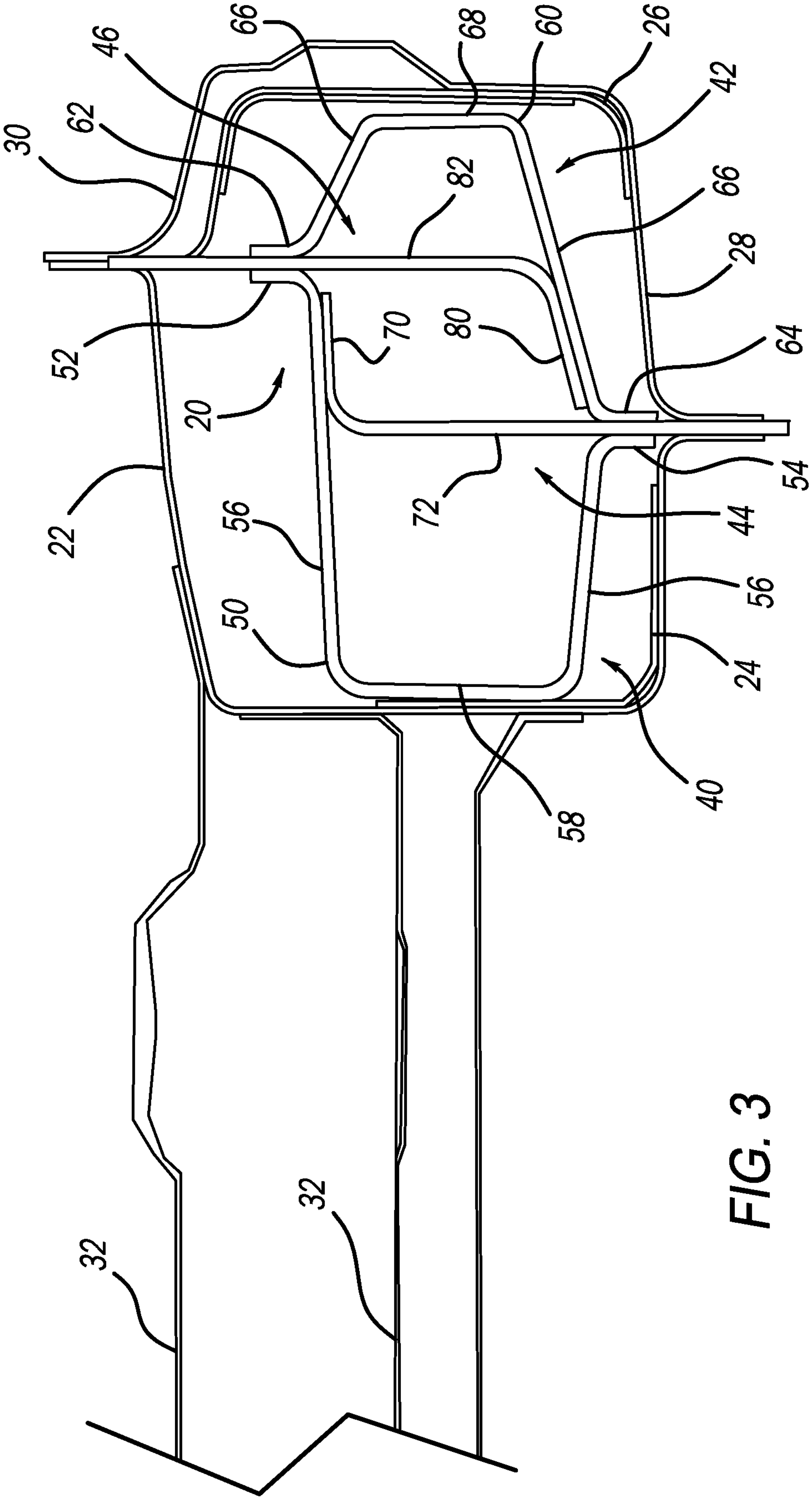
FIG. 3 is a cross-sectional view of the beam of FIG. 1.

The cup portion 50 includes a pair of side surfaces 56 and a web 58. Thus, the panel 40 provides a reinforcement member. Also, one of the sides 56 is longer than the other side 56 so that the flanges 52, 54 are offset more than 15% of the sill width with respect to one another as seen in FIG. 3.

The second outboard side beam reinforcement panel 42 has an overall cup shape in cross section with a cup portion 60 that includes a pair of flanges 62, 64 one on each side of the cup portion 60. The cup portion 60 includes side surfaces 66 and a web 68 between the side surfaces 66. The flanges 62, 64 are offset, more than 15% of the sill width, with respect to one another. One of the side surfaces 66 is longer than the other as seen in FIG. 3. This provides an offset for the reinforcement beam panel 42. The offset is in the opposite configuration of the first panel 40 so that the flanges 52, 62, as well 54,64, adjoin one another as seen in FIG. 3.

The third reinforcement beam panel 44 has an L-shape in cross section with a short leg 70 and a long leg 72. The long leg 72 extends through the first and second panel flanges to secure with the inner and outer sill. The short leg 70 is devoid of a flange. However, if desired, a flange 74 could be present as in FIG. 4. The third reinforcement beam panel 44 has its L-shape 70 such that the short leg 70 that projects or extends toward the fourth reinforcement beam panel 46 long leg 82.

Figure 4:
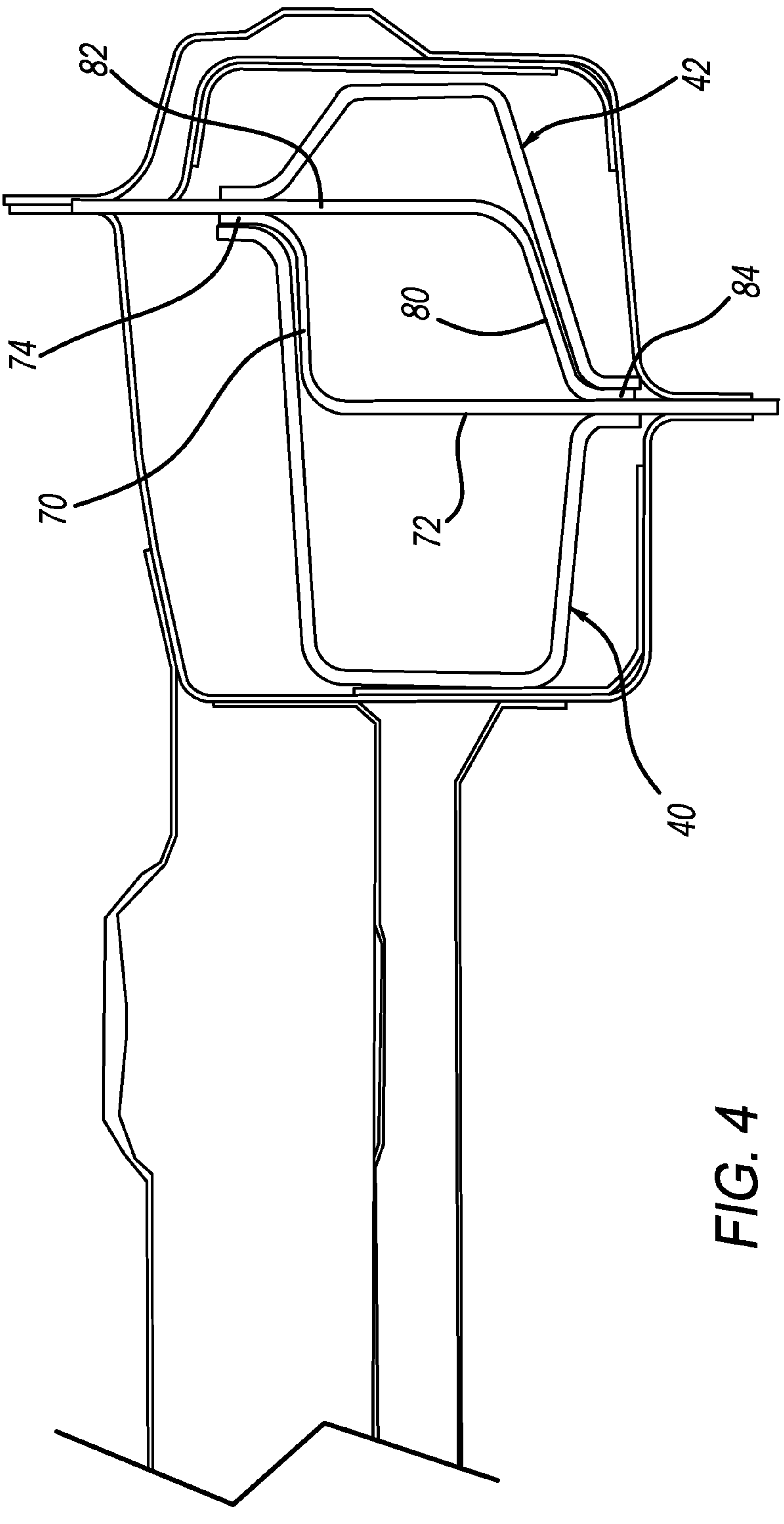
FIG. 4 is a cross-sectional view like FIG. 3 of a second embodiment.

The fourth reinforcement beam panel 46 includes an L-shape cross section with a short leg 80 and a long leg 82. The leg 82 extends through the first and second panel flanges to secure with the inner or outer sill. The long leg 82 is on the opposing side of the reinforcement beam panel 46 when compared with the third reinforcement beam panel 44 as seen in FIG. 3. Also, the opposing side of the fourth panel short leg portion 80 is devoid of a flange. However, the short leg could have flange 84 if desired as seen in FIG. 4. The fourth reinforcement beam panel 46 has its short leg 80 that projects or extends toward the third reinforcement beam panel long leg 72 as seen in FIG. 3.

By having the third and fourth reinforcement beam panels 44, 46 with their long legs 72, 82 on opposite sides of one another, one long leg adjoins and is welded with the first flanges 52, 62 while the other adjoins and is welded to the opposing second flanges 54, 64. Thus, the reinforcement member 20 includes four reinforcement beam panels, with cup shaped cross sections, that are welded to one another at the flanges.

The reinforcement beam panels 40-46 are manufactured from a steel material so that various gauges and grades of material may be utilized to optimize the reinforcement beam 20 for various vehicles. The reinforcement beam panels 40-46 are either stamped or rolled formed and joined together by welding or other fastening options. The middle reinforcement beam panels 44, 46 have a height and width that can be set to interface and secure with the sill or rocker flanges to connect the vehicle sill reinforcement system beam 20 with the vehicle. Accordingly, as shown, the first reinforcement panel beam panel 40 is attached to the sill inner panel 22. The second reinforcement beam panel 42 is located close to the sill outer panel 29. The third reinforcement beam panel 44 is connected to the sill lower flanges while the fourth reinforcement beam panel 46 is connected to the sill's upper flanges. The offset of the upper and lower flanges of the first and second reinforcement beam panels 40, 42 are aligned to have an offset of greater than 15% of the sill's lateral width. The sill reinforcement system beam 20 is independent of the body side outer style. Also, the reinforcement beam panels may include stiffening beads, notched beads, holes, cutouts or the like to tune the reinforcement beam 20.

Figure 5:
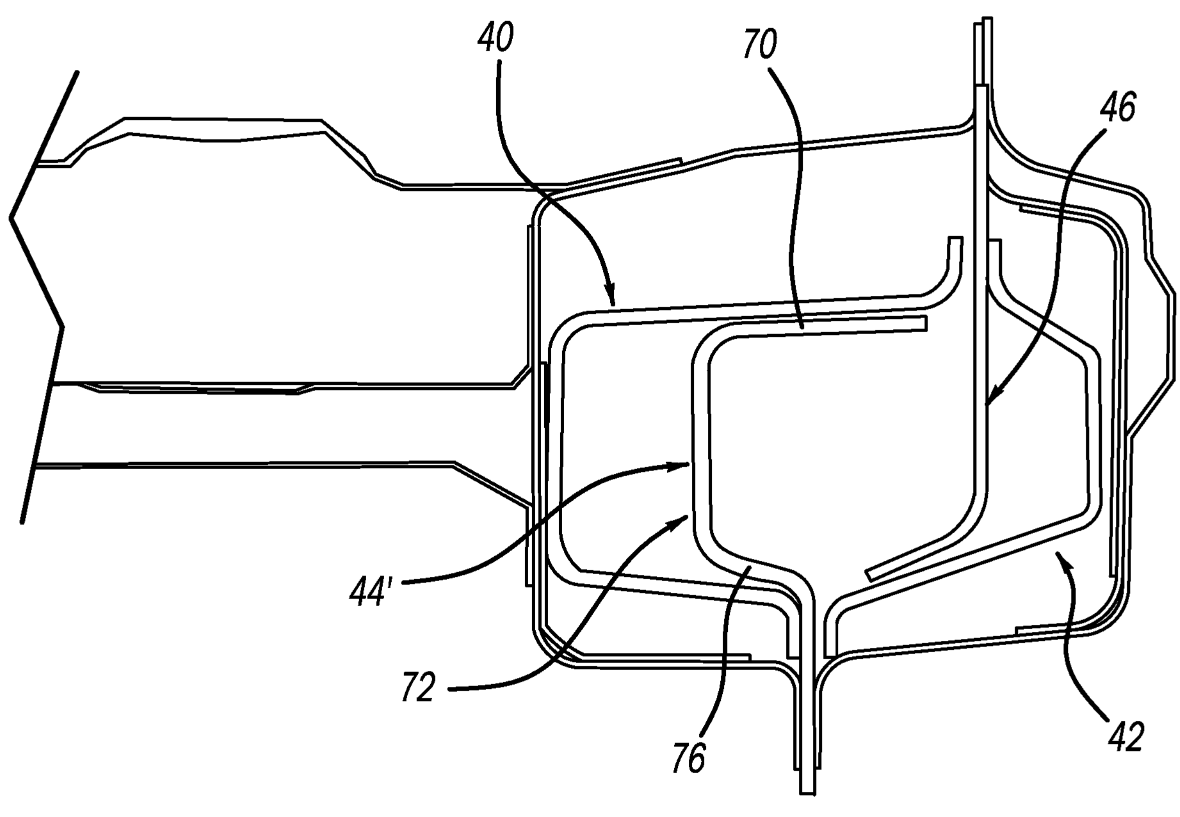
FIG. 5 is a cross-sectional view like FIG. 3 of a third embodiment.

Turning to FIG. 5, an additional embodiment shows the elements that are the same identified with the same reference numbers. The third embodiment beam panel 44' includes a jog 76 that opposes the short leg 70 to provide a U-shape in the third reinforcement beam panel 46'. The jog 76 has a shorter length than the short leg 70. In addition, it can be seen that the short legs of each panel 44' and 46 are unsecured to the first and second elongated beam panels 40 and 42, respectively.

Figure 6:
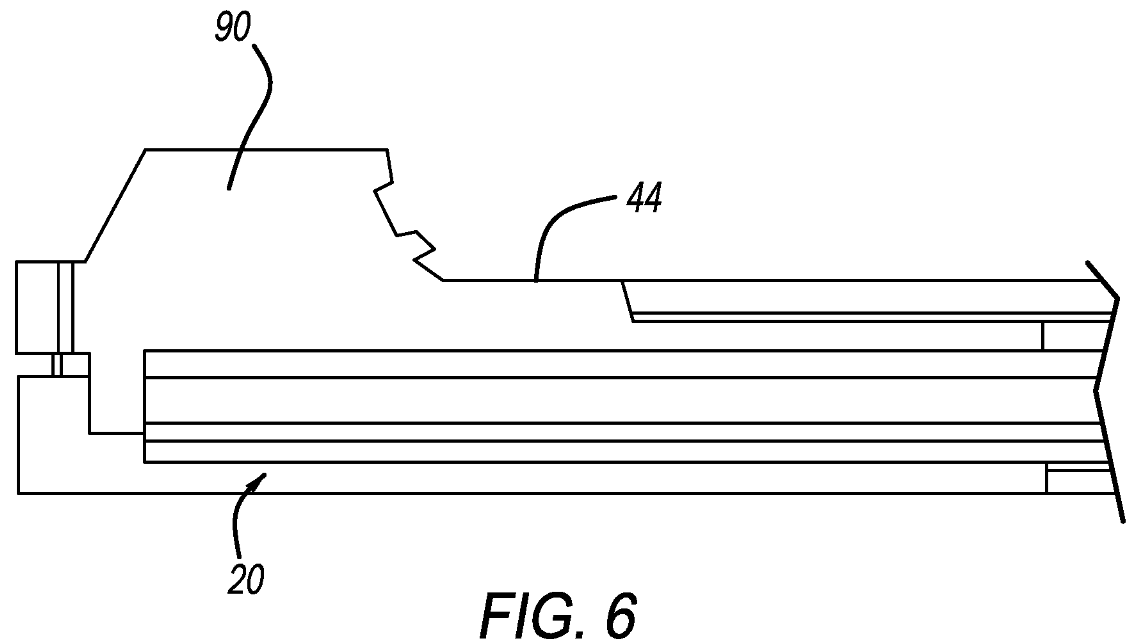
FIG. 6 is an elevation view of an additional embodiment of the beam.

FIG. 6 illustrates the reinforcement beam 20 with a shear plate 90 on the third beam panel 44 at the sill front end. The reinforcement or shear plate 90 is combined to provide and act as a shear plate at the front end of the sill to enhance energy absorption from offset frontal impacts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reinforcement beam for a vehicle sill comprising:

a first elongated beam panel having an overall cup shape in cross section with first and second sides connected by a first web, the first side being longer than the second side, a first flange connected to the first side and a second flange connected to the second side, the first and second flanges being on each respective side of the cup shape so that the first and second flanges are offset with respect to one another;

a second elongated beam panel, opposing the first elongated beam panel, having an overall cup shape in cross section with third and fourth sides connected by a second web, the third side being longer than the fourth side, a third flange connected to the third side and a fourth flange connected to the fourth side, the third and fourth flanges being on each respective side of the cup shape so that the third and fourth flanges are offset with respect to one another, wherein the first flange is opposed to the fourth flange and the second flange is opposed to the third flange, and the longer first and third sides are opposed to one another;

a third elongated beam panel defined by a first long leg and a first short leg, the third elongated beam panel positioned between the first and second elongated beam panels with the first long leg extending between the second and third flanges of the first and second elongated beam panels; and a fourth elongated beam panel defined by a second long leg and a second short leg, the fourth elongated beam panel positioned between the first and second elongated beam panels with the second long leg extending between the first and fourth flanges of the first and second elongated beam panels, wherein the first and second short legs each terminate adjacent the second and first long legs, respectively.

2. The reinforcement beam for a vehicle of claim 1, wherein the first and second short legs are unsecured to the first and second elongated beam panels.

3. The reinforcement beam for a vehicle of claim 1, wherein the first and second long legs are secured with the vehicle sill.

4. The reinforcement beam for a vehicle of claim 3, wherein a profile of the first and second long legs are interrupted along a length of the respective third and fourth elongated beam panels.

5. The reinforcement beam for a vehicle of claim 1, wherein the first or second long leg has a jog to define a U-shape with either the first or second short leg.

6. A vehicle with a sill or rocker panel comprising:

an inner sill panel and an outer sill panel; and a reinforcement beam positioned between the inner and outer sill panels, the reinforcement beam including:

a first elongated beam panel having an overall cup shape in cross section with first and second sides connected by a first web, the first side being longer than the second side, a first flange connected to the first side and second flange connected to the second side, the first and second flanges being on each respective side of the cup shape so that the first and second flanges are offset with respect to one another;

a second elongated beam panel, opposing the first elongated beam panel, having an overall cup shape in cross section with third and fourth sides connected by a second web, the third side being longer than the fourth side, a third flange connected to the third side and a fourth flange connected to the fourth side, the third and fourth flanges being on each respective side of the cup shape so that the third and fourth flanges are offset with respect to one another, wherein the first flange is opposed to the fourth flange and the second flange is opposed to the third flange, and the longer first and third sides are opposed to one another;

a third elongated beam panel defined by a first long leg and a first short leg, the third elongated beam panel positioned between the first and second elongated beam panels with the first long leg extending between the second and third flanges of the first and second elongated beam panels; and a fourth elongated beam panel defined by a second long leg and a second short leg, the fourth elongated beam panel positioned between the first and second elongated beam panels with the second long leg extending between the first and fourth flanges of the first and second elongated beam panels.

7. The vehicle with a sill or rocker panel of claim 6, wherein the first and second short legs are unsecured to the first and second elongated beam panels.

8. The vehicle with a sill or rocker panel of claim 6, wherein the first and second long legs define a flange secured between the inner sill panel and the outer sill panel.

9. The vehicle with a sill or rocker panel of claim 6, wherein the first short leg includes a flange secured between the opposing first and fourth flanges, and the second short leg includes a flange secured between the opposing second and third flanges.

10. The vehicle with a sill or rocker panel of claim 9, wherein a profile of the first and second long legs is interrupted along a length of the respective third and fourth elongated beam panels.

11. The vehicle with a sill or rocker panel of claim 6, wherein the first and second short legs terminate adjacent the second and first long legs, respectively.

12. The vehicle with a sill or rocker panel of claim 6, wherein one of the first and second long legs is secured with the inner sill panel.

13. The vehicle with a sill or rocker panel of claim 12, wherein the other of the first and second long legs is secured to the outer sill panel.

14. The vehicle with a sill or rocker panel of claim 6, wherein one of the first and second long legs is secured with the outer sill panel.

15. The vehicle with a sill or rocker panel of claim 14, wherein the other of the first and second long legs is secured to the inner sill panel.

* * * * *